(12) United States Patent
Haramaty et al.

(10) Patent No.: US 10,708,219 B2
(45) Date of Patent: Jul. 7, 2020

(54) SIMPLIFIED PACKET ROUTING

(71) Applicant: Mellanox Technologies Ltd., Yokneam (IL)

(72) Inventors: Zachy Haramaty, Hemed (IL); Diego Crupnicoff, Buenos Aires (AR); Freddy Gabbay, Givatayim (IL); Benny Koren, Zichron Yaakov (IL); Amiad Marelli, Tel Aviv (IL); Itamar Rabenstein, Petah Tikva (IL); Ido Bukspan, Herzliya (IL); Oded Zemer, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 49 days.

(21) Appl. No.: 15/356,588

(22) Filed: Nov. 20, 2016

(65) Prior Publication Data
US 2017/0070474 A1    Mar. 9, 2017

Related U.S. Application Data

(63) Continuation of application No. 14/046,976, filed on Oct. 6, 2013, now Pat. No. 9,548,960.

(51) Int. Cl.
*H04L 29/12* (2006.01)
*H04L 12/18* (2006.01)
*H04L 12/741* (2013.01)
*H04L 12/761* (2013.01)

(52) U.S. Cl.
CPC ........... *H04L 61/103* (2013.01); *H04L 12/18* (2013.01); *H04L 45/16* (2013.01); *H04L 45/745* (2013.01)

(58) Field of Classification Search
None
See application file for complete search history.

(56) References Cited

U.S. PATENT DOCUMENTS

| 6,115,385 | A | * | 9/2000 | Vig ................... H04L 29/12009 370/401 |
| 6,614,758 | B2 | | 9/2003 | Wong |
| 6,665,297 | B1 | | 12/2003 | Harigochi et al. |
| 6,795,886 | B1 | | 9/2004 | Nguyen |
| 6,807,175 | B1 | * | 10/2004 | Jennings ................. H04L 12/18 370/390 |

(Continued)

FOREIGN PATENT DOCUMENTS

WO    2016105446 A1    6/2016

OTHER PUBLICATIONS

U.S. Appl. No. 14/745,488 Office Action dated Dec. 6, 2016.
(Continued)

*Primary Examiner* — Jeffrey M Rutkowski
*Assistant Examiner* — Andre Tacdiran
(74) *Attorney, Agent, or Firm* — Kligler & Associates Patent Attorneys Ltd

(57) ABSTRACT

A method for communication, includes routing unicast data packets among nodes in a network using respective Layer-3 addresses that are uniquely assigned to each of the nodes. Respective Layer-2 unicast addresses are assigned to the nodes in accordance with an algorithmic mapping of the respective Layer-3 addresses. The unicast data packets are forwarded within subnets of the network using the assigned Layer-2 addresses.

10 Claims, 3 Drawing Sheets

(56) References Cited

U.S. PATENT DOCUMENTS

| | | | |
|---|---|---|---|
| 6,912,589 B1* | 6/2005 | Jain | H04L 12/1886 370/389 |
| 7,274,869 B1 | 9/2007 | Pan et al. | |
| 7,899,930 B1* | 3/2011 | Turner | H04L 49/10 370/351 |
| 7,924,837 B1* | 4/2011 | Shabtay | H04L 12/1886 370/235 |
| 8,489,718 B1 | 7/2013 | Brar et al. | |
| 8,495,194 B1 | 7/2013 | Brar et al. | |
| 8,621,111 B2 | 12/2013 | Marr et al. | |
| 8,625,427 B1 | 1/2014 | Terry et al. | |
| 8,681,641 B1* | 3/2014 | Sajassi | H04L 45/745 370/249 |
| 8,755,389 B1 | 6/2014 | Poutievski et al. | |
| 8,873,567 B1 | 10/2014 | Mandal et al. | |
| 9,042,234 B1* | 5/2015 | Liljenstolpe | H04L 45/00 370/238 |
| 9,571,400 B1 | 2/2017 | Mandal et al. | |
| 2001/0043614 A1* | 11/2001 | Viswanadham | H04L 49/602 370/469 |
| 2002/0009073 A1* | 1/2002 | Furukawa | H04L 29/06 370/352 |
| 2002/0026525 A1* | 2/2002 | Armitage | H04L 12/185 709/238 |
| 2002/0071439 A1 | 6/2002 | Reeves et al. | |
| 2002/0085586 A1* | 7/2002 | Tzeng | H04L 12/5601 370/475 |
| 2002/0141412 A1 | 10/2002 | Wong | |
| 2002/0176363 A1 | 11/2002 | Durinovic-Johri et al. | |
| 2003/0016624 A1 | 1/2003 | Bare | |
| 2003/0097438 A1* | 5/2003 | Bearden | H04L 41/0213 709/224 |
| 2004/0024903 A1* | 2/2004 | Costatino | H04L 45/00 709/238 |
| 2004/0062242 A1* | 4/2004 | Wadia | H04L 45/00 370/390 |
| 2005/0157641 A1 | 7/2005 | Roy | |
| 2006/0143300 A1 | 6/2006 | See et al. | |
| 2006/0215645 A1* | 9/2006 | Kangyu | H04L 12/4641 370/360 |
| 2007/0030817 A1* | 2/2007 | Arunachalam | H04L 12/18 370/254 |
| 2007/0091911 A1 | 4/2007 | Watanabe et al. | |
| 2007/0104192 A1* | 5/2007 | Yoon | H04L 12/4641 370/389 |
| 2007/0183418 A1* | 8/2007 | Riddoch | H04L 12/18 370/389 |
| 2008/0101378 A1* | 5/2008 | Krueger | H04L 12/2856 370/395.52 |
| 2008/0112413 A1 | 5/2008 | Pong | |
| 2008/0186981 A1 | 8/2008 | Seto et al. | |
| 2008/0267078 A1 | 10/2008 | Farinacci et al. | |
| 2008/0298248 A1 | 12/2008 | Roeck et al. | |
| 2009/0010159 A1 | 1/2009 | Brownell et al. | |
| 2009/0022154 A1* | 1/2009 | Kiribe | H04L 12/185 370/390 |
| 2009/0097496 A1* | 4/2009 | Nakamura | H04N 5/268 370/419 |
| 2009/0262741 A1* | 10/2009 | Jungck | H04L 29/12066 370/392 |
| 2010/0020796 A1* | 1/2010 | Park | H04L 63/1441 370/390 |
| 2010/0049942 A1 | 2/2010 | Kim et al. | |
| 2010/0111529 A1* | 5/2010 | Zeng | H04L 12/18 398/58 |
| 2010/0141428 A1 | 6/2010 | Mildenberger et al. | |
| 2010/0216444 A1 | 8/2010 | Mariniello et al. | |
| 2010/0290385 A1 | 11/2010 | Ankaiah et al. | |
| 2010/0290458 A1 | 11/2010 | Assarpour et al. | |
| 2011/0080913 A1* | 4/2011 | Liu | H04L 12/4641 370/392 |
| 2011/0085440 A1 | 4/2011 | Owens et al. | |
| 2011/0090784 A1 | 4/2011 | Gan | |
| 2011/0164518 A1 | 7/2011 | Daraiseh et al. | |
| 2011/0225391 A1 | 9/2011 | Burroughs et al. | |
| 2011/0255410 A1 | 10/2011 | Yamen et al. | |
| 2012/0075999 A1 | 3/2012 | Ko et al. | |
| 2012/0147752 A1 | 6/2012 | Ashwood-Smith et al. | |
| 2012/0163797 A1 | 6/2012 | Wang | |
| 2012/0170582 A1 | 7/2012 | Abts et al. | |
| 2012/0207175 A1 | 8/2012 | Raman et al. | |
| 2012/0287791 A1 | 11/2012 | Xi et al. | |
| 2013/0044636 A1 | 2/2013 | Koponen et al. | |
| 2013/0083701 A1 | 4/2013 | Tomic et al. | |
| 2013/0114619 A1 | 5/2013 | Wakumoto | |
| 2013/0159548 A1 | 6/2013 | Vasseur et al. | |
| 2013/0204933 A1* | 8/2013 | Cardona | G06F 9/542 709/204 |
| 2013/0208720 A1 | 8/2013 | Ellis et al. | |
| 2013/0297757 A1* | 11/2013 | Han | H04L 41/0806 709/222 |
| 2013/0329727 A1* | 12/2013 | Rajagopalan | H04L 12/4641 370/390 |
| 2013/0336164 A1 | 12/2013 | Yang et al. | |
| 2014/0016457 A1 | 1/2014 | Enyedi et al. | |
| 2014/0022942 A1* | 1/2014 | Han | H04L 41/0803 370/254 |
| 2014/0043959 A1 | 2/2014 | Owens et al. | |
| 2014/0105034 A1 | 4/2014 | Sun | |
| 2014/0140341 A1 | 5/2014 | Bataineh et al. | |
| 2014/0169173 A1 | 6/2014 | Naouri et al. | |
| 2014/0198636 A1 | 7/2014 | Thayalan et al. | |
| 2014/0269305 A1 | 9/2014 | Nguyen | |
| 2014/0313880 A1 | 10/2014 | Lu et al. | |
| 2014/0328180 A1 | 11/2014 | Kim et al. | |
| 2015/0092539 A1 | 4/2015 | Sivabalan et al. | |
| 2015/0124815 A1 | 5/2015 | Beliveau et al. | |
| 2015/0127797 A1 | 5/2015 | Attar et al. | |
| 2015/0131663 A1 | 5/2015 | Brar et al. | |
| 2015/0172070 A1 | 6/2015 | Csaszar | |
| 2015/0194215 A1 | 7/2015 | Douglas et al. | |
| 2015/0249590 A1 | 9/2015 | Gusat et al. | |
| 2016/0043923 A1 | 2/2016 | Gopalarathnam | |
| 2016/0080120 A1 | 3/2016 | Unger et al. | |
| 2016/0080321 A1 | 3/2016 | Pan et al. | |
| 2016/0182378 A1 | 6/2016 | Basavaraja et al. | |
| 2017/0054591 A1 | 2/2017 | Hyoudou et al. | |
| 2018/0139132 A1 | 5/2018 | Edsall et al. | |

OTHER PUBLICATIONS

U.S. Appl. No. 14/337,334 Office Action dated Oct. 20, 2016.
Dally et al., "Deadlock-Free Message Routing in Multiprocessor Interconnection Networks", IEEE Transactions on Computers, vol. C-36, No. 5, May 1987, pp. 547-553.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.
U.S. Appl. No. 14/970,608 Office Action dated May 30, 2017.
U.S. Appl. No. 14/673,892 Office Action dated Jun. 1, 2017.
U.S. Appl. No. 14/970,608 office action dated Nov. 1, 2017.
U.S. Appl. No. 15/152,077 office action dated Dec. 1, 2017.
U.S. Appl. No. 15/050,480 office action dated Jan. 22, 2018.
U.S. Appl. No. 15/387,718 office action dated Mar. 9, 2018.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.
U.S. Appl. No. 14/732,853 Office Action dated Jan. 26, 2017.
U.S. Appl. No. 15/050,480 office action dated Nov. 2, 2018.
U.S. Appl. No. 15/152,077 office action dated Jul. 16, 2018.
U.S. Appl. No. 15/050,480 office action dated Jun. 28, 2019.
U.S. Appl. No. 15/896,088 office action dated Jun. 12, 2019.

(56) References Cited

OTHER PUBLICATIONS

U.S. Appl. No. 15/218,028 office action dated Jun. 26, 2019.
U.S. Appl. No. 15/050,480 office action dated Apr. 9, 2020.

* cited by examiner

SIMPLIFIED PACKET ROUTING

CROSS-REFERENCE TO RELATED APPLICATION

This application is a continuation of U.S. patent application Ser. No. 14/046,976, filed Oct. 6, 2013.

FIELD OF THE INVENTION

The present invention relates generally to computer networks, and particularly to routing data packets between subnets.

BACKGROUND

Routers are commonly used to forward data packets among subnets of a Layer-3 network. (A subnet, short for subnetwork, is a logical subdivision of a Layer-3 network.) Network ports of nodes within a given subnet share the same Layer-3 network address prefix. For example, in Internet Protocol (IP) networks, the ports in each subnet share the same most-significant bit-group in their IP address, so that the IP address is logically divided into two fields: a network or routing prefix, and the rest field or host identifier. Similarly, in InfiniBand™ (IB) networks, each subnet is uniquely identified with a subnet identifier known as the Subnet Prefix. For each port in the subnet, this prefix is combined with a respective Globally-Unique Identifier (GUID) to give the IB Layer-3 address of the port, known as the Global Identifier (GID).

Typically, the logical subdivision of a Layer-3 network into subnets reflects the underlying physical division of the network into Layer-2 local area networks. Routers forward packets among subnets on the basis of their Layer-3 (IP or GID) destination addresses, while within a given subnet packets are forwarded among ports by Layer-2 switches or bridges. These Layer-2 devices operate in accordance with the applicable Layer-2 protocol and forward packets within the subnet according to the Layer-2 destination address, such as the Ethernet™ medium access control (MAC) address or the IB link-layer Local Identifier (LID). In general, Layer-2 addresses in a given subnet are recognized only within that subnet, and routers will swap the Layer-2 address information of packets that they forward from one subnet to another.

Routers in most existing networks—particularly IP networks—use the Address Resolution Protocol (ARP) to resolve Layer-3 addresses of packets that they receive into Layer-2 addresses that can be used for local forwarding within the destination subnet. ARP was first defined by Plummer in "An Ethernet Address Resolution Protocol," published as Request for Comments (RFC) 826 of the Internet Engineer Task Force (IETF), in 1982. ARP is a request/reply protocol that specifies a packet structure that can be used by nodes in a network to query and inform one another as to the Ethernet address that corresponds to any given IP address. Routers use ARP to build lookup tables of the correspondence between IP and Layer-2 addresses, which they can then use in packet forwarding.

In some multicast applications, MAC addresses may be defined on the basis of corresponding IP multicast addresses. A scheme of this sort is defined, for example, by Hinden et al., in "IP Version 6 Addressing Architecture," published as IETF RFC 2373 (1998). In this scheme, IPv6 multicast addresses are mapped into Ethernet MAC addresses by taking the low-order 32 bits of the IPv6 multicast address and using them to create a MAC multicast address. Thus, new IPv6 multicast addresses are assigned so that the group identifier is always in the low-order 32 bits.

SUMMARY

Embodiments of the present invention that are described hereinbelow provide improved methods and systems for packet routing and forwarding in and among subnets.

There is therefore provided, in accordance with an embodiment of the invention, a method for communication, which includes routing unicast data packets among nodes in a network using respective Layer-3 addresses that are uniquely assigned to each of the nodes. Respective Layer-2 unicast addresses are assigned to the nodes in accordance with an algorithmic mapping of the respective Layer-3 addresses, and the unicast data packets are forwarded within subnets of the network using the assigned Layer-2 addresses.

Typically, the Layer-3 addresses each include a subnet prefix and a respective globally-unique identifier (GUID), and assigning the respective Layer-2 unicast addresses includes mapping the GUID to a local identifier (LID). Additionally or alternatively, assigning the respective Layer-2 unicast addresses includes mapping the Layer-3 addresses to unicast medium access control (MAC) addresses.

In a disclosed embodiment, forwarding the unicast data packets includes selecting respective ports of a switch through which the unicast data packets are to be transmitted to the nodes by applying the algorithmic mapping to the Layer-3 addresses.

In one embodiment, assigning the respective Layer-2 unicast addresses includes mapping a first field within the respective Layer-3 addresses to generate the Layer-2 unicast addresses, and forwarding the unicast data packets includes assigning the unicast data packets to respective traffic classes within the subnets by mapping respective values of a second field within the Layer-3 addresses to the traffic classes.

The method may also include routing multicast data packets among the nodes in the network using a Layer-3 multicast address, and forwarding the multicast data packets within the subnets using a common Layer-2 multicast address that is derived by algorithmic mapping from the Layer-3 multicast address.

There is also provided, in accordance with an embodiment of the invention, a method for communication, which includes receiving in a router a multicast data packet, having a Layer-3 multicast address, for transmission to nodes in multiple subnets of a Layer-3 network using a common Layer-2 multicast address corresponding to the Layer-3 address in all of the subnets. A single lookup operation is performed in the router, based on the Layer-2 or Layer-3 multicast address, in order to identify output ports in two or more of the subnets through which the multicast data packet is to be forwarded by the router. The multicast data packet is forwarded from the router to the two or more of the subnets via the identified output ports using the common Layer-2 address.

Typically, the common Layer-2 multicast address is derived by an algorithmic mapping from the Layer-3 multicast address.

The output ports identified in the single lookup operation may include both a first port in a source subnet of the multicast data packet and a second port in another of the subnets, other than the source subnet, to which the router is connected for forwarding of the multicast data packet.

In a disclosed embodiment, forwarding the multicast data packet includes deriving respective subnet mask vectors for the subnets, and selecting the output ports of the router through which the multicast data packet is to be transmitted using the subnet mask vectors.

The method may also include, upon receiving the forwarded multicast data packet at a host in the network, filtering the data packet in a network interface controller of the host according to the Layer-3 multicast address.

There is additionally provided, in accordance with an embodiment of the invention, a system for communication, including a plurality of routers, which are configured to route unicast data packets among nodes in a network using respective Layer-3 addresses that are uniquely assigned to each of the nodes. A management processor is configured to assign respective Layer-2 unicast addresses to the nodes in accordance with an algorithmic mapping of the respective Layer-3 addresses, whereby the unicast data packets are forwarded within subnets of the network using the assigned Layer-2 addresses.

There is further provided, in accordance with an embodiment of the invention, apparatus for communication, including a plurality of ports, which are configured to receive from a Layer-3 network a multicast data packet, having a Layer-3 multicast address, for transmission to nodes in multiple subnets of the Layer-3 network using a common Layer-2 multicast address corresponding to the Layer-3 address in all of the subnets. Routing logic is configured to perform a single lookup operation based on the Layer-2 or Layer-3 multicast address in order to identify the ports in two or more of the subnets through which the multicast data packet is to be forwarded and to forward the multicast data packet via the identified ports to the two or more of the subnets using the common Layer-2 address.

The present invention will be more fully understood from the following detailed description of the embodiments thereof, taken together with the drawings in which:

DETAILED DESCRIPTION OF EMBODIMENTS

Routing and forwarding of data packets among subnets by routers that are known in the art typically require multiple lookup operations, both to ascertain the egress port through which each packet should be transmitted and to translate the Layer-3 address of the packet into the appropriate Layer-2 address for forwarding in the destination subnet. These lookup operations consume processing resources and chip area and increase the latency of packet transfer through the router.

Embodiments of the present invention that are described hereinbelow use algorithmic mapping in order to reduce the computational load and latency that are associated with packet routing. In some of these embodiments, unicast data packets are routed among nodes in a network using respective Layer-3 addresses that are uniquely assigned to each of the nodes, while respective Layer-2 unicast addresses are assigned to the nodes by algorithmic mapping of the respective Layer-3 addresses. In other words, the Layer-2 addresses are not arbitrarily allocated or fixed in advance (as is usually the case in Ethernet networks, for example), but are rather assigned values that can be derived by applying a predefined mathematical algorithm to the Layer-3 addresses. A router can thus determine the Layer-2 destination address to use for each incoming Layer-3 unicast packet by simply applying the appropriate algorithm, without ARP queries or lookup, and can then transmit these packets via the appropriate egress ports for forwarding within subnets of the network using these Layer-2 addresses.

Additionally or alternatively, algorithmic mapping may be applied to Layer-3 multicast addresses and may be configured so that the same Layer-2 multicast address is commonly used in forwarding a given multicast data packet to multiple different subnets (or all subnets). In such implementations, the router looks up the common Layer-2 multicast address only once, performing a single lookup to identify all of the multiple subnets to which the multicast data packet is to be transmitted. No Layer-3 lookup is required at all in this case. The Layer-2 multicast address is used to look up a respective subnet mask vector for each subnet, and the router selects the egress ports through which the multicast data packet is to be transmitted using these subnet mask vectors.

Figure 1:
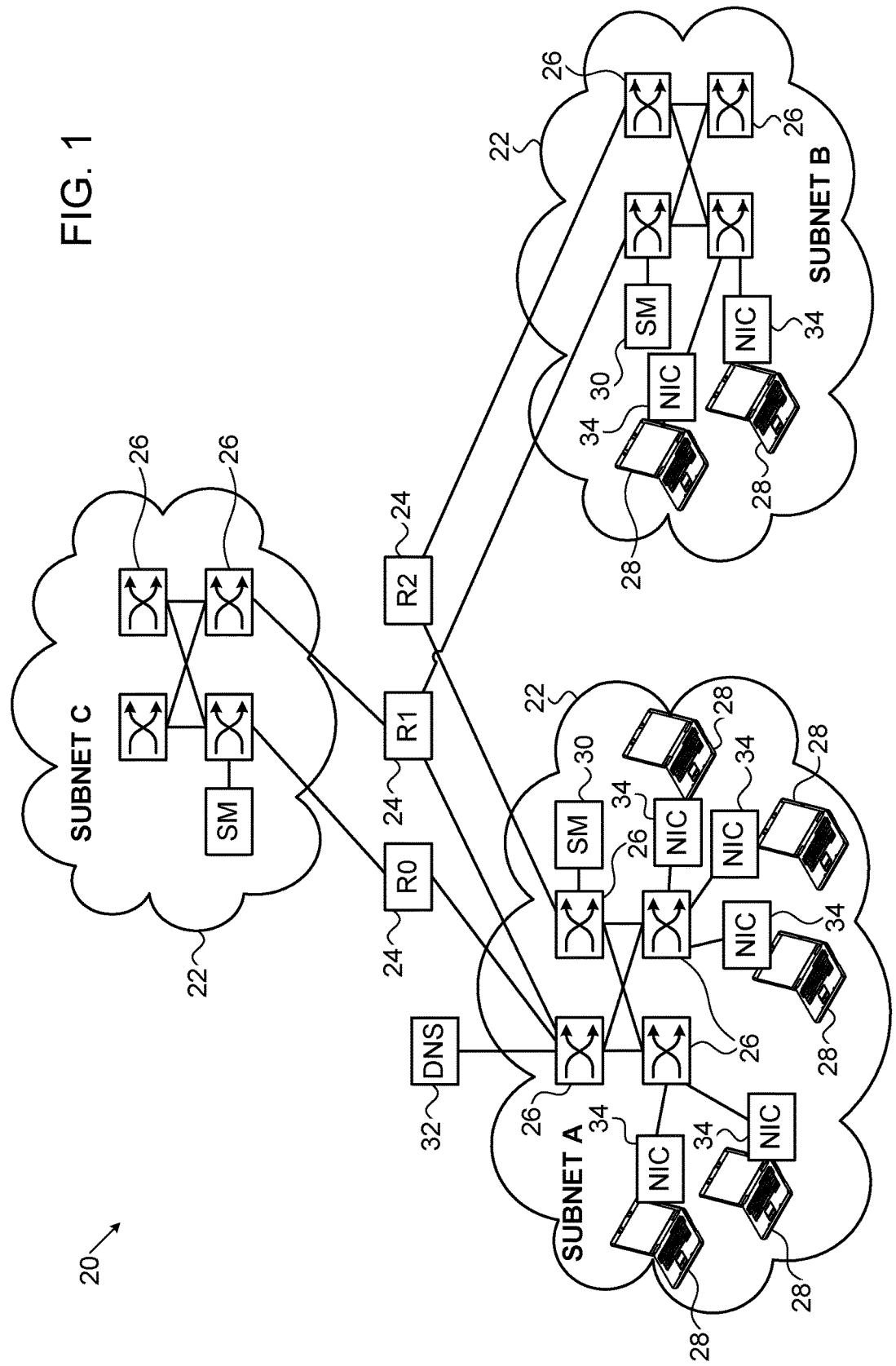
FIG. 1 is a block diagram that schematically illustrates a computer network, in accordance with an embodiment of the present invention.

FIG. 1 is a block diagram that schematically illustrates a computer network 20, in accordance with an embodiment of the present invention. It will be assumed, for clarity and convenience of description, that network operates in accordance with InfiniBand (IB) specifications. Relevant features of the IB architecture are described in the *InfiniBand™ Architecture Specification* Volume 1 (Release 1.2.1, November 2007), distributed by the InfiniBand Trade Association and incorporated herein by reference, and particularly in Chapter 14: "Subnet Management" and Chapter 19: "Routers."

Alternatively, the principles of the present invention may similarly be applied in other networks in which Layer-2 addresses can be assigned at will. Conventional Ethernet networks do not generally satisfy this criterion, since MAC addresses are typically fixed in hardware. On the other hand, in virtualized and other tunneled IP and Ethernet networks (such as "MAC-in-MAC" provider backbone bridges, as defined by the IEEE 802.1ah standard), MAC addresses may be assigned and applied as provided by embodiments of the present invention.

Network 20 comprises multiple subnets 22 (labeled subnets A, B and C), which are interconnected by Layer-3 routers 24 (labeled R0, R1 and R2). Each subnet 22 comprises multiple Layer-2 switches 26, which connect to hosts 28 via suitable network interface controllers (NICs) 34, which are referred to in IB parlance as host channel adapters. Switches 26 within each subnet may be interconnected in any suitable topology, such as a "fat tree" topology. Certain of the switches (for example, spine switches in the case of a fat tree) connect to routers 24 and thus enable packet transfer between subnets. In the pictured implementation, any given pair of subnets 22 is separated by no more than a single routing hop, but the principles of the present invention may also be extended to networks in which traffic between certain subnets must traverse two or more routers in sequence. Typically (although not necessarily), each pair of subnets 22 is connected by two or more routers 24, for purposes of load balancing and failure protection.

A subnet manager (SM) 30 in each subnet 22 performs management and administration functions defined by the above-mentioned IB specification. (Optionally, more than one subnet manager may exist in a given subnet to provide backup in case of failure, but typically only a single subnet manager is active in performing these functions at any given time.) Specifically, SM 30 in each subnet assigns a Layer-2 address, in the form of a LID, to each physical port of each host 28 within the given subnet. A subnet administration (SA) function provides nodes with information gathered by the SM, including communication of the LID information to a Subnet Management Agent (SMA) in each node of the subnet. For simplicity and clarity in the description that follows, however, all of these subnet management and administration functions will be assumed to be carried out by the SM. Layer-2 switches 26 within each subnet 22 are configured by SM 30 to forward packets among the ports on the basis of the destination LID (D-LID) in the packet header.

SM 30 is typically a combined hardware/software element, comprising a computing platform, such as an embedded or stand-alone central processing unit (CPU) with a memory and suitable interfaces, which runs management software that performs the functions described herein. This sort of hardware/software entity is also referred to, in the context of the present description and in the claims, as a management processor. The computing platform may be dedicated to subnet management functions, or it may alternatively be integrated with one of the nodes in the subnet, such as a host computer, switch or appliance, and possibly shared with other computing and communication functions. The software components of the SM may be downloaded to the computing platform in electronic form, for example over network 20 or via a separate control network (not shown). Alternatively or additionally, these software components may be stored on tangible, non-transitory computer-readable media, such as in optical, magnetic, or electronic memory.

SM 30 in each subnet 22 assigns a Layer-2 address, in the form of a LID, to each port of each switch 26 and host 28 within the subnet. Each port also receives a GID Layer-3 address (which may also be assigned by SM 30), wherein all ports in a given subnet have the same GID prefix, as explained above, but each port in the subnet has a different GUID. Each SM 30 assigns the LIDs in its subnet so that they correspond algorithmically to the respective GIDs, as explained in greater detail hereinbelow. In addition, a distributed name server (DNS) 32, at a predefined address in network 20, may collect and store names and/or numbers besides the LID and GID, such as a domain name, IP address or MAC address, that identify nodes and/or processes in the network. DNS 32 may provide information on the correspondence between these names and/or numbers and GID values in response to queries from nodes in the network.

Figure 2:
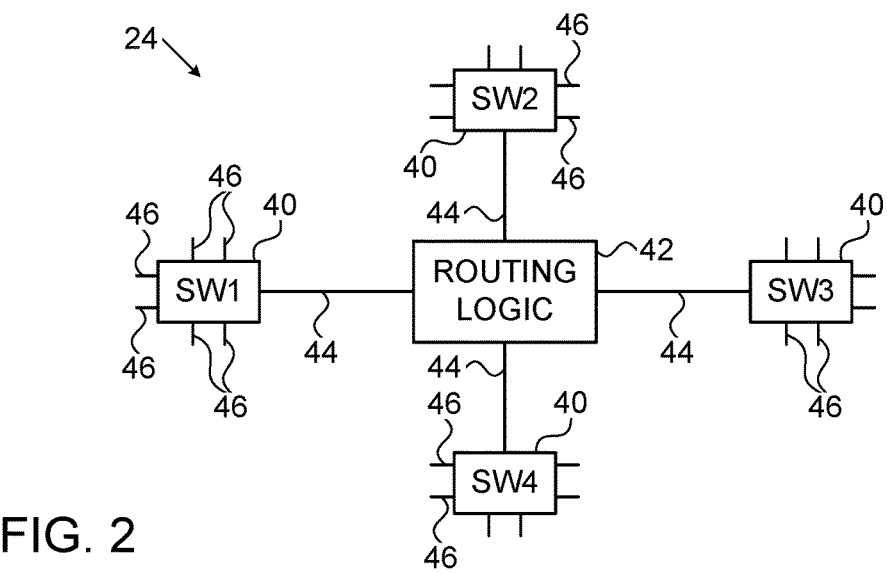
FIG. 2 is a block diagram that schematically illustrates an integrated router and switch, in accordance with an embodiment of the present invention.

FIG. 2 is a block diagram that schematically shows details of an integrated router and switch 24, in accordance with an embodiment of the present invention. The integrated router and switch is a type of router and is referred to simply as router 24 in the description that follows. This router architecture is shown by way of example, to illustrate a possible implementation of the routing and forwarding techniques that are described herein, while showing the distinction between Layer-3 and Layer-2 routing and forwarding functions. The components of router 24 may desirably be implemented in a single integrated circuit device. The principles of the present invention may alternatively be implemented, however, in routers and switches of other types having the capabilities to perform algorithmic mapping between Layer-3 and Layer-2 addresses.

In the present embodiment, router 24 comprises a number of Layer-2 switches 40, each serving a respective subnet via local ports 46 and capable of forwarding data packets among these ports on the basis of the DLID carried in the packet header. For inter-subnet traffic, switches 40 are interconnected by routing logic 42 via respective routing ports 44. Inter-subnet data packets are transmitted by nodes in each subnet to the LID that is assigned (by the subnet manager) to routing port 44 of the respective switch 40.

Routing logic 42 receives these packets and examines the DGID of each packet in order to determine the subnet (and hence the switch 40) or subnets (and switches) to which it is to be routed. For unicast packets, the routing logic identifies the destination subnet and switch according to the GID prefix, while computing the DLID by algorithmic mapping of the DGID and thus identifying the proper egress port 46. For multicast packets, the multicast DLID and DGID do not change, and routing logic 42 simply identifies the one or more egress switches and ports corresponding to the multicast DLID. These functions are described in greater detail hereinbelow.

Figure 3:
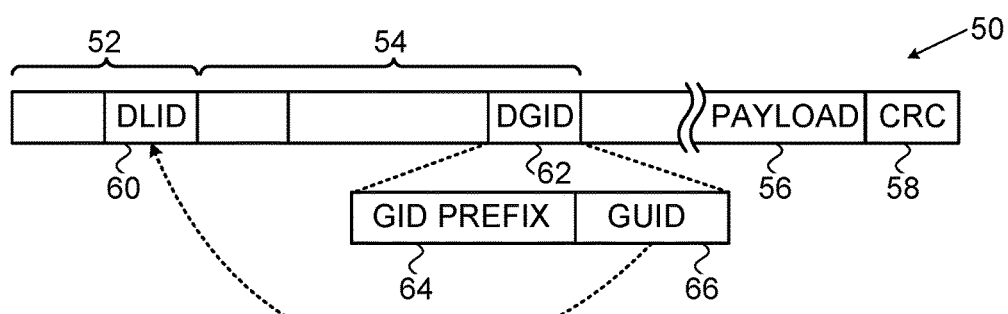
FIG. 3 is a block diagram that schematically illustrates a data packet, in accordance with an embodiment of the present invention.

FIG. 3 is a block diagram that schematically illustrates a unicast data packet 50, which exemplifies a method of algorithmic address mapping in accordance with an embodiment of the present invention. The packet layout is simplified, and the description of the packet headers is limited to the fields that are directly relevant to the present embodiment. The terminology used in describing packet 50 is taken from the IB context, but other packet network standards, such as IP standards, use similar sorts of packet structures.

Packet 50 comprises a Layer-2 header 52, referred to as a Local Routing Header (LRH), followed by a Layer-3 header 54, referred to as a Global Routing Header (GRH), followed by transport headers (not shown), a payload 56, and an error detection field 58, which typically contains a cyclic redundancy code (CRC). The Layer-2 destination address, or DLID, is contained in a DLID field 60 in header 52, while the Layer-3 destination address, or DGID, is contained in a DGID field 62 in header 54. For unicast packets, such as the packet shown in FIG. 3, the DGID comprises a subnet prefix, referred to as a GID prefix 64, which is common to all ports in a given subnet 22, and a respective globally-unique identifier (GUID) 66.

As illustrated by the dashed arrow in FIG. 3, SM 30 assigns a unicast LID to each port in subnet 22 by algorithmic mapping of the corresponding GUID 66. (Equivalently, in other types of networks, Layer-3 addresses are mapped to unicast MAC addresses.) In IB networks, the GUID is sixty-four bits long, while the LID is only sixteen bits, and any suitable combination of the bits in the GUID may be used to derive the LID. Probably the simplest solution (and an effective solution) is to set the LID equal to the sixteen least significant bits (LSB) of the GUID. Optionally, to avoid situations in which two different GUIDs in a given subnet have the same sixteen LSB, and thus map to the same LID, SM 30 may assign alias GUIDs that map uniquely to the respective LIDs, and may then publish the resulting alias GUID values to DNS 32. (The alias GUID implicitly defines an alias GID that contains the alias GUID.) For example, SM may assign each alias GUID to be the corresponding sixteen-bit LID preceded by forty-eight zeros.

Alternatively, other algorithmic mapping functions may be applied in mapping the GUID of each port in a subnet to the LID. The term "algorithmic mapping function" means that the function can be computed mathematically by an appropriate computing entity (such as routing logic 42) without resort to a lookup table. Any suitable function can be used for this purpose, including arithmetic, algebraic, and Boolean functions, as long as it is chosen so as to create a one-to-one mapping between GUIDs and LIDs in the subnet.

In some networks, Layer-2 packets are assigned to different traffic classes, which are referred to in IB networks as service levels (SLs). The SL is identified by four bits in Layer-2 header 52 (not marked in FIG. 3). The SL value may, along with the DLID of a given packet, be assigned by algorithmic mapping from the DGID. Thus, for example, a first field (such as the sixteen LSB) within GUID 66 may be mapped to generate the value of DLID field 60, while the SL value is determined by mapping from a second field within GUID 66, such as the next four bits of the GUID. In IB networks, the SL bits are used both in determining service priority and in assigning packets to virtual lanes. This latter function is applied in avoiding credit loops, as well as controlling packet forwarding, and for this reason in particular, proper algorithmic mapping of SL values is useful and important.

Although the example shown in FIG. 3 relates specifically to unicast packets, the same sorts of algorithms that are described above may be used to map the multicast GID of a multicast Layer-3 packet to a corresponding multicast DLID. In this latter case, however, the multicast GID is typically mapped to the same multicast DLID throughout the network. Router 24 may maintain a table showing the ports to which packets with each such multicast DLID are to be forwarded, such as the table shown below:

TABLE 1

MULTICAST FORWARDING TABLE

|  | Subnet 0 |  |  | Subnet 1 . . . | Subnet 3 |  |
|---|---|---|---|---|---|---|
| Port# | 31 | 30 | 29 | . . . | 1 | 0 |
| MC LID 1 | 0 | 1 | 1 | . . . | 1 | 1 |
| MC LID 2 | 0 | 0 | 0 | . . . | 0 | 1 |
| . . . |  |  |  |  |  |  |
| MC LID n | 1 | 1 | 1 | . . . | 1 | 1 |

In the table above, each row corresponds to a particular multicast LID, and each column corresponds to one of ports 46. The entries "1" and "0" indicate whether or not packets with the corresponding multicast LID are to be forwarded to the corresponding port. This single table covers all of the subnets to which router 24 is connected, including the source subnet of any given multicast packet.

Figure 4:
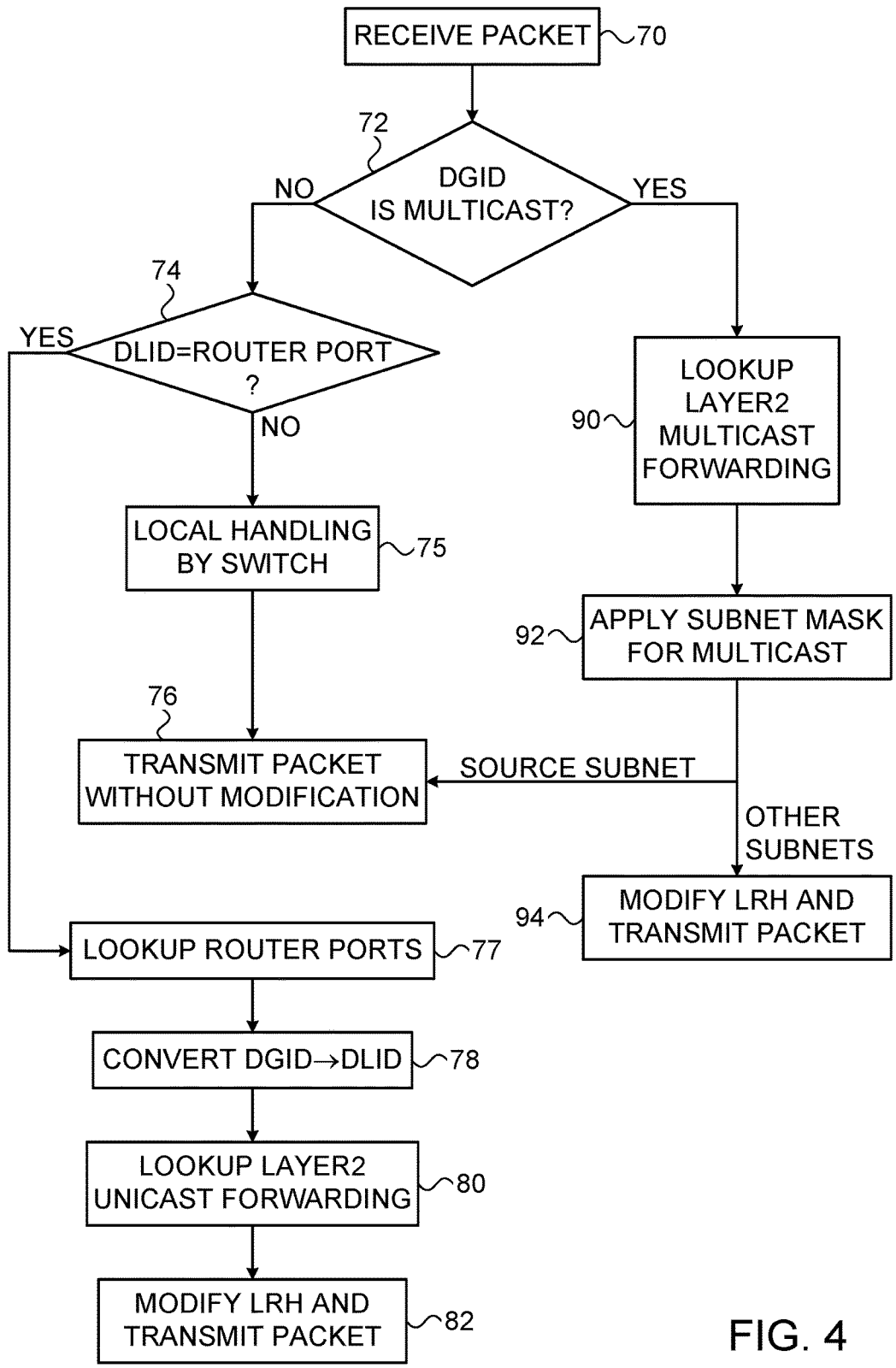
FIG. 4 is a flow chart that schematically illustrates a method for packet routing and forwarding, in accordance with an embodiment of the present invention.

FIG. 4 is a flow chart that schematically illustrates a method for packet routing and forwarding, in accordance with an embodiment of the present invention. This method relates to both unicast and multicast packets. The method is described below, for the sake of convenience and clarity, with reference to network 20 and router 24 (FIGS. 1 and 2), but it may similarly be applied, mutatis mutandis, in other sorts of networks and router architectures.

The method of FIG. 4 is initiated each time router 24 receives an incoming data packet via one of switches 40, at a packet reception step 70. Switch 40 checks whether the packet is a global multicast packet, at a multicast checking step 72. If not, the packet is a unicast packet, and the switch checks whether the Layer-2 destination address (DLID) of the packet is the address of routing port 44, indicating that the packet is destined to another subnet, at a DLID checking step 74. If the results of the checks at both of steps 72 and 74 are negative, the switch concludes that the packet is to be forwarded only within the current subnet 22, at a local handling step 75. In this case, switch 40 simply forwards the packet via one or more of local ports 46 on the basis of the DLID, without changing the LRH or the time-to-live (TTL) value in the packet header, at a local forwarding step 76.

If the result of step 74 is positive, on the other hand, switch 40 forwards the packet to routing logic 42. The routing logic checks Layer-3 header 54 and identifies the destination subnet of the packet based on GID prefix 64. The routing logic thus selects the routing port 44 through which the packet will be passed to the corresponding egress switch 40, at a port lookup step 77. Routing logic 42 also applies algorithmic mapping, as described above, to convert the DGID value (specifically GUID 66) of the packet to the appropriate DLID, at an address mapping step 78. This mapping is carried out once for each packet, by routing logic 42, regardless of whether the packet is multicast or unicast.

Routing logic 42 passes each unicast packet via the selected port 44 to the appropriate switch 40, which then chooses the appropriate local port 46 for egress of the packet, at a Layer 2 lookup step 80. The choice of egress port is based on the DLID assigned at step 78 and will typically have different values in each subnet to which a given packet is transmitted. Switch 40 inserts the DLID in the appropriate field 60 of the outgoing packet, and also updates the source LID (SLID), at a packet transmission step 82. The traffic class (service level) in the Layer-2 header of the outgoing packet may also be updated by mapping of GUID 66, as explained above, and the TTL value in the packet header is decremented. The switch then transmits the packet into the destination subnet 22.

If the packet is found at step 72 to contain a multicast DGID, on the other hand, the switch 40 receiving the packet looks up the Layer 2 ports 46 through which the packet is to be forwarded, at a multicast lookup step 90. The lookup is typically referred to a multicast forwarding table of the general form that is illustrated above in Table 1. As each multicast GID is mapped to the same multicast LID over the entire network 20, a single lookup of this sort is sufficient to cover all subnets 22 to which any given multicast packet is to be forwarded.

Each switch 40 applies a subnet mask, in the form of a vector that indicates the egress ports 46 to use for each multicast DLID, at a masking step 92. When the ingress switch forwards a multicast subnet within its own subnet, the packet is transmitted through the applicable ports 46 without modification, at step 76, as described above. On the other hand, when a switch forwards a multicast packet that originated from another subnet, the Layer 2 header and the TTL value are appropriately updated, at a packet transmission step 94.

As Layer-3 multicast addresses are global, the mapping applied at step 90 may result in two or more multicast DGIDs being mapped to the same multicast DLID. Consequently, a given host 28 may receive multicast packets that are destined for a multicast group to which the host does not belong. To avoid confusion in this sort of situation, NIC 34 may be configured to filter incoming multicast packets according to the DGID, and discard multicast packets whose GID is not in a list of multicast groups for which the host has registered.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
receiving in an integrated router including routing logic and a plurality of layer-2 switches, multicast data packets, each having a Layer-3 multicast destination address and a Layer-2 multicast destination address corresponding to the Layer-3 multicast address in all of a plurality of subnets serviced by the integrated router and layer-2 switches;
for at least one of the multicast data packets received by the integrated router:
identifying, in accordance with a single lookup operation, a plurality of layer-2 output ports through which the at least one multicast data packet is to be forwarded by the integrated router, wherein the single lookup operation includes the integrated router looking up the Layer-2 multicast destination address only once and determining two or more subnets corresponding to the plurality of layer-2 output ports; and
forwarding the at least one multicast data packet from the integrated router to the identified plurality of layer-2 output ports in the two or more subnets without changing the Layer-2 multicast destination address of the at least one multicast packet,
wherein the forwarding of the at least one of the multicast data packets through at least one of the plurality of layer-2 output ports includes updating a time to live (TTL) value of the forwarded multicast data packet.

2. The method according to claim 1, wherein the Layer-2 multicast destination address is derived by applying an algorithmic mapping function to the corresponding Layer-3 multicast address.

3. The method according to claim 1, wherein the plurality of layer-2 output ports identified in the single lookup operation for the at least one of the multicast data packet comprises both a first port in a source subnet of the multicast data packet and a second port in another of the subnets, other than the source subnet, to which the router is connected for forwarding of the at least one multicast data packet.

4. The method according to claim 3, wherein the forwarding comprises forwarding the at least one of the received multicast data packet via the first port without modification and via the second port with an updated layer 2 header and an updated TTL value.

5. The method according to claim 1, wherein the single lookup operation comprises
deriving respective subnet mask vectors for the subnets, and selecting the output ports of the router through which the at least one multicast data packet is to be transmitted using the subnet mask vectors.

6. The method according to claim 1, and comprising, upon receiving the forwarded multicast data packet at a host in the network, filtering the data packet in a network interface controller of the host, by comparing the Layer-3 multicast address of the data packet to a list of layer-3 multicast addresses of multicast groups to which the host is registered.

7. The method according to claim 1, wherein the forwarding is performed without a lookup based on layer-3 information.

8. An apparatus for communication, implementing an integrated router including layer-2 switches, comprising:
a plurality of layer-2 ports, which are configured to receive multicast data packets,
wherein the received multicast data packets have a Layer-3 multicast destination address, and a Layer-2 multicast destination address corresponding to the Layer-3 address in all of a plurality of subnets serviced by the integrated router;
a multicast forwarding table indicating for multicast addresses, through which of the plurality of ports packets directed to the multicast address are to be forwarded; and
routing logic configured to:
identify, in accordance with a single lookup operation, a plurality of layer-2 output ports through which at least one of the received multicast data packets is to be forwarded by the integrated router, wherein the single lookup operation includes the integrated router looking up the Layer-2 multicast destination address only once and determining two or more subnets corresponding to the plurality of layer-2 output ports;
forward the at least one of the received multicast data packets from the integrated router to the identified plurality of layer-2 output ports in the two or more subnets without changing the Layer-2 multicast destination address of the at least one received multicast packet; and
update a time to live (TTL) value of the forwarded multicast data packet when forwarding the packet through at least one of the plurality of layer-2 output ports.

9. The apparatus according to claim 8, wherein the Layer-2 multicast addresses of the multicast packets are derived by applying an algorithmic mapping function to the corresponding Layer-3 multicast addresses of the packets.

10. The apparatus according to claim 8, wherein the routing logic is configured to apply respective subnet mask vectors for the subnets in order to select the ports through which the at least one of the received multicast data packet is to be transmitted to each of the determined two or more subnets.

* * * * *